INVENTOR:
William E. Martin
BY
Eberhard E. Wettly
Atty.

United States Patent Office 3,427,736
Patented Feb. 18, 1969

3,427,736
SCRAPER BOWL MANIPULATING APPARATUS ATTACHABLE WITH AND OPERABLE FROM AN ATTENDANT VEHICLE
William E. Martin, % Martin Company, P.O. Box 187, Kewanee, Ill. 61443
Filed Jan. 3, 1966, Ser. No. 518,283
U.S. Cl. 37—129    10 Claims
Int. Cl. E02f 3/72, 3/82

ABSTRACT OF THE DISCLOSURE

An earth working assembly and vehicle therefor comprising a scraper bowl having an ejector therein and means for independently manipulating the bowl and the ejector. Means are provided to raise and lower the bowl without disturbing the ejector position. Additional means are provided to ensure that the ejector maintains an unskewed position throughout its movement through the bowl.

Figure 1:
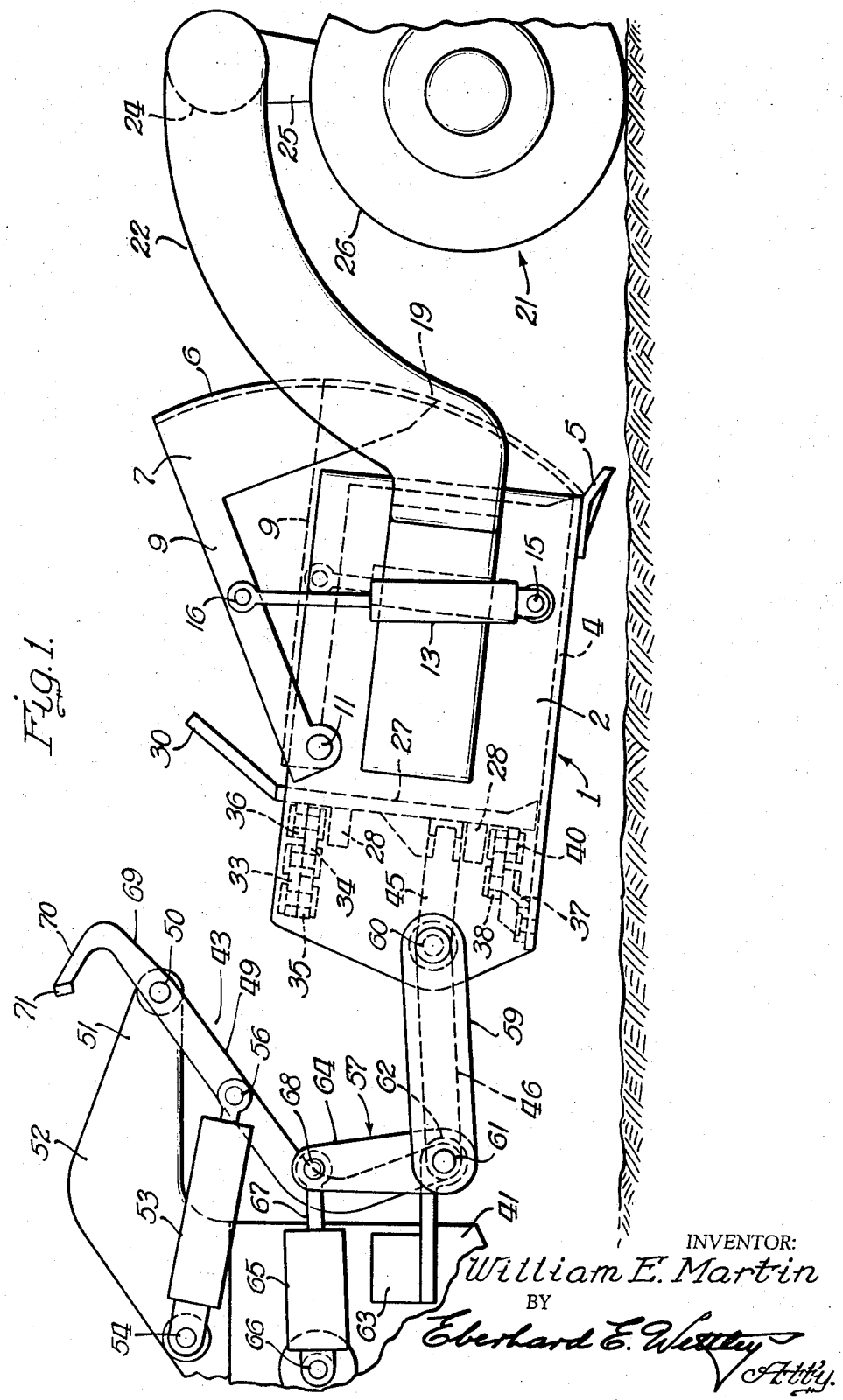

The present invention relates to a road working scraper bowl being wheel supported at one end and which is equipped at its other end with apparatus to manipulate the bowl between loading, transport and unloading positions, and to handle the bowl material according to the requirements of the job, such apparatus being arranged for releasable attachment with an attendant vehicle which functions to maneuver and to operate the scraper bowl in accordance with the operator's guidance and control.

More specifically, this invention is directed to a road working scraper bowl provided with a movable ejector blade to discharge bowl held material and which bowl is provided with a closure hood at its loading and discharge end for controlling loading or unloading of material as needed, such scraper bowl also including apparatus to raise and lower the bowl and apparatus to manipulate the ejector blade within the confines of the bowl, wherein both of the apparatus mentioned are adapted for releasable attachment with a mobile power vehicle for the support and operation of the scraper bowl assembly by an operator riding on the power vehicle.

It is one of the objects of the present invention to provide a road working scraper with a scraper bowl that is maneuvered and manipulated by apparatus mounted on a power vehicle and which includes further apparatus to move and actuate the ejector blade of the material carrying bowl wherein this latter apparatus is also mounted on the power vehicle, the function of both apparatus being controlled from the power vehicle.

It is another object, therefore, to have the apparatus that controls the bowl assembly of a road scraper adapted for releasable connection and support upon an attendant vehicle and wherein the function and operation of the bowl assembly is thus carried out through such apparatus and solely from the attendant vehicle.

Another object is to provide one or more sets of link means between the attendant vehicle and the scraper bowl to maneuver the bowl directionally and to raise and lower the bowl in relation to the surface being worked.

A still further object is to provide one or more sets of link means between the attendant vehicle and the scraper bowl material ejection blade to actuate the blade through the bowl from a retracted or rearward bowl wall forming relationship during bowl loading activity to any intermediate or full forward bowl material unloading or dispensing relationship.

And another object is to provide the link means of the independent bowl and blade control link sets so as to include certain link end pin connections in the respective sets that occupy coaxial positions when the bowl blade is fully retracted to permit raising or lowering the bowl without inducing blade movement within the bowl to maintain a full open bowl and to maintain the maximum load capacity space within said bowl during loading or during raising the bowl into transport position.

And a still further object is to provide stabilizing link structures in said bowl to hold the ejector blade in a non-tilt position under and during the operation of the blade actuating link means and during blade movement in the bowl.

Other objects and advantages of the present invention shall hereinafter appear in or become evident from the following detailed description having reference to the accompanying drawings forming a part of this specification.

Figure 2:
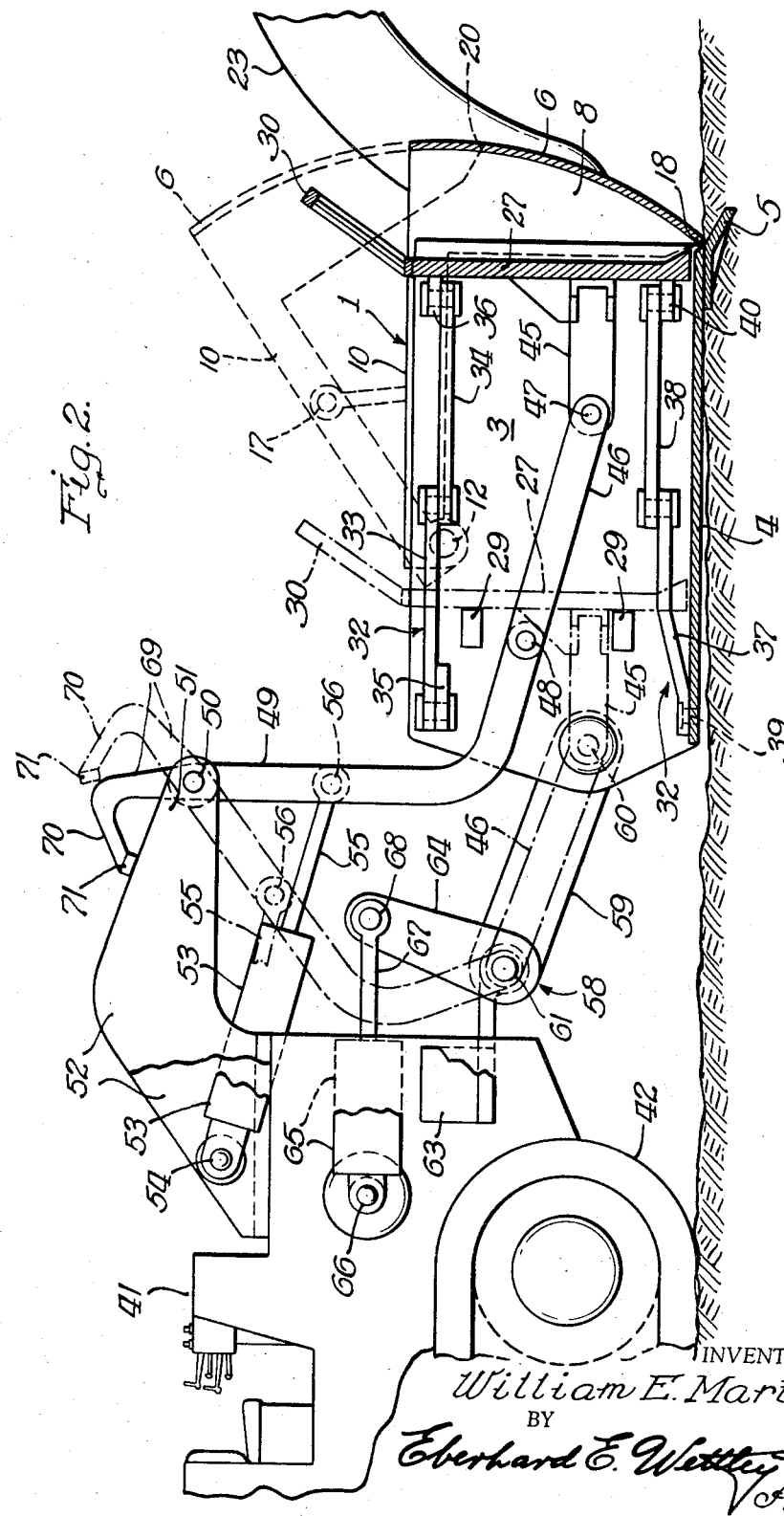
Figure 3:
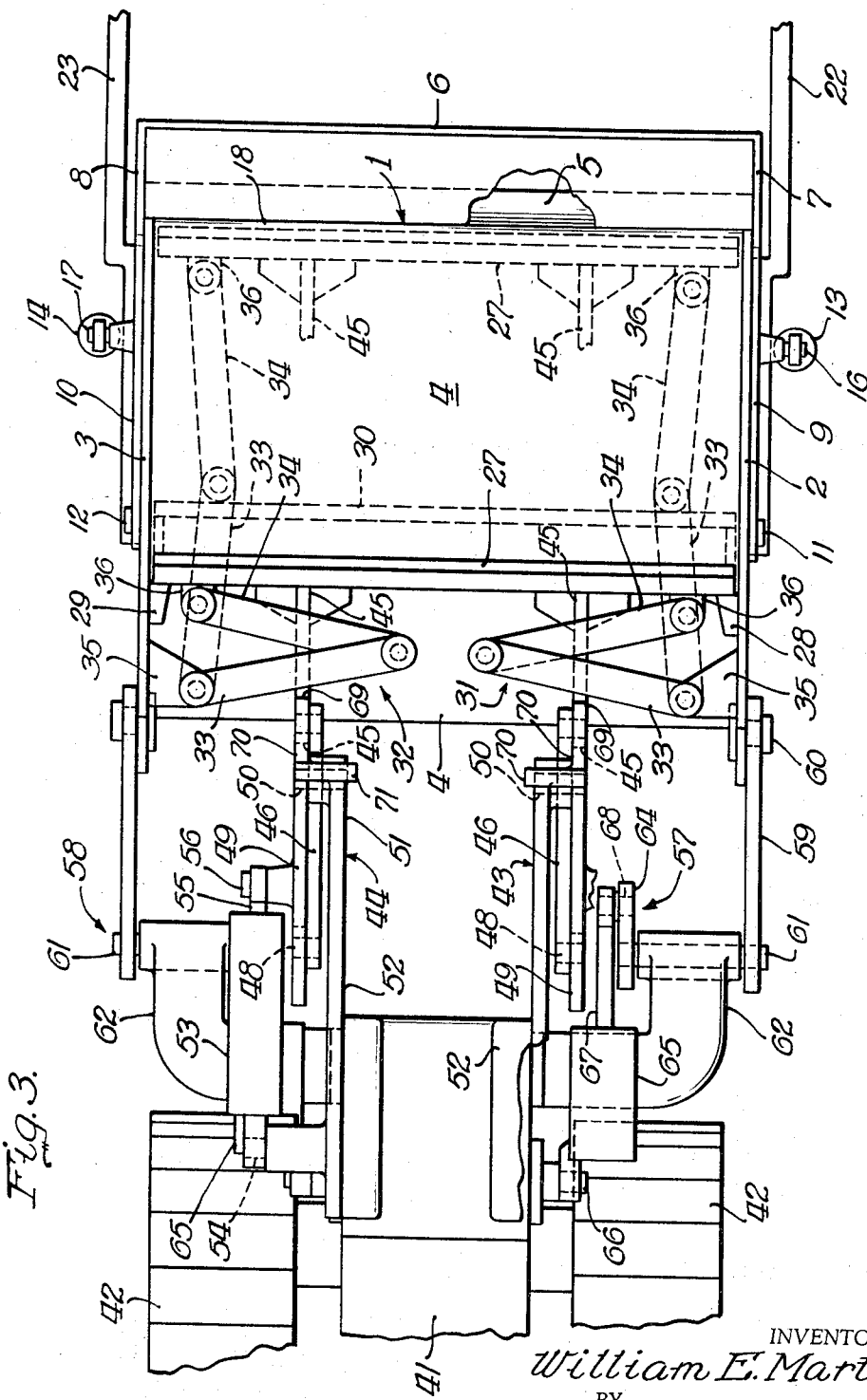

In the drawings:

FIG. 1 is a side elevational view of the road working scraper of the present invention shown as attached to and connected in tandem with an attendant vehicle, the link structures shown serving both as connecting and maneuvering means as well as the scraper bowl manipulating devices to operate the bowl and its material ejector;

FIG. 2 is a central longitudinal cross section view through the scraper bowl primarily illustrating the link structures on the far side of the bowl and with some of the near side link apparatus broken away at the attendant vehicle; and FIG. 3 is a plan view of the road working scraper bowl tandem assembly with the scraper bowl ejector blade mechanism retracted to dispose the blade in its rearmost position for full capacity bowl loading, certain of the upper link means having been broken away at the near side of the assembly to better illustrate the lower link means of the apparatus of this invention.

Referring now to the drawings, the scraper bowl 1 is constructed with side walls 2 and 3 joined by the bottom wall 4 which terminates with a ground engaging cutting blade 5 at its forward end. This makes a scoop bowl structure open fore and aft and a forward closure hood 6 with side wings 7 and 8 is carried on arms 9 and 10 that swing on pivots 11 and 12 on the bowl sides 2 and 3. Suitable hydraulic cylinders 13 and 14 are mounted to swing on bowl pivots 15 and to connect at 16 and 17 with arms 9 and 10 to provide means to raise and lower the hood structure from the hood contact edge at 18 on cutting blade 5 to any selected raised position such as shown at 19 in FIG. 1 or 20 in FIG. 2 as examples.

The bowl assembly is supported forwardly on wheel means 21 of any suitable type and as best shown in FIGS. 1 and 3, the forward mobile means comprises a pair of side arms 22 and 23 suitably secured to the side walls 2 and 3 of bowl 1 to project forwardly and upwardly to join with a transverse tube 24 that provides a support bracket means 25 that connects with the carriage of one or more wheels such as 26. It is through the vertical rocking of the side arms 22 and 23 with the bowl and through the bracket means 25 and the wheel means 21 that the bowl can be moved toward the surface to be worked or upwardly away therefrom, thus changing the level of the bowl bottom 4 and cutting blade 5 according to the selected conditions of use and need. FIG. 1 shows one elevated position of bowl 1 while FIG. 2 shows a lowered bowl position for ground cutting to load the bowl with the material being worked.

As stated hereinbefore, the bowl 1 is open ended fore and aft receiving and discharging material at the forward cutting blade 5 end of the bowl. A transverse ejector blade 27 is carried in the bowl for actuation between the fully retracted position shown in FIG. 1 to a fully forward position shown in full lines in FIG. 2 which is the maximum bowl material discharge position. Suitable stop lugs 28 on wall 2 of the bowl and lugs 29 on wall 3 of the bowl limit and establish the maximum retracted position of the ejector blade 27. Blade 27 also carries a suitable stone guard 30 across its upper end to aid in confining loaded material to the bowl cavity allotted to carry such material.

Since blade 27 is slidable through bowl 1 and is subjected to considerable load reaction during material discharge from the bowl, stabilizing linkages 31 and 32 are provided in matched sets to counteract blade tilt under the discharge operation or during blade retraction. Linkages 31 comprise paired upper and lower link assemblies at one side of the ejector blade 27. The upper link assembly comprises connected links 33 and 34 carried by bracket 35 on a bowl wall and bracket 36 on blade 27. The lower link assembly comprises connected links 37 and 38 carried on floor 4 at 39 and connected with bracket 40 on blade 27.

Linkages 32 also have paired upper and lower link assemblies of the same character as those described above as the coacting linkages 31 so that the same reference numbers are applied to the duplicated structures.

One or more linkage assemblies are provided to actuate the ejector blade 27 and these assemblies are suitably solely mounted and carried upon an attendant vehicle which may be any type of conventional power unit or the like. In the drawings the vehicle shown is a power unit 41 carried upon continuous tracks 42, such a vehicle being usually referred to as a crawler tractor. Link assemblies used to push and retract the bowl ejector blade 27 are alike in construction except for being left and right hand as identified by the numbers 43 and 44, respectively, as best shown in FIG. 3. The link assembly 43 comprises a fixed arm 45 secured to and forming a part of blade 27, a connecting drag link 46 pivoted at 47 on the end of link 45 and connected with pin 48 on the end of the L-shaped swinging support link 49 that is pivoted at 50 on the projecting end 51 of the support bracket 52 mounted on the crawler tractor or power unit 41.

A hydraulic power cylinder 53 is interposed between the L-shaped link 49 and mounting bracket 52 to swing on pivot 54 on the bracket and having the cylinder ram 55 pivoted at 56 on the link 49. It is contemplated to use a suitable equal flow valving arrangement with hydraulic lines to each of the two hydraulic cylinders 53—53 whereby to provide equal and simultaneous motion to the links 49—49 to move the two ends of the blade 27 transversely through the bowl by means of the two spaced and fixed arms 45 on blade 27.

With the described dual link assemblies it is easy for an operator on the attendant vehicle to move the ejector blade between the two positions shown in both FIGS. 2 and 3, which represent a position of full retraction of the blade against stops 28 and 29 to a forward position at the discharge mouth of the scraper bowl over the cutting blade thereof.

To simplify the explanation and for the sake of greater clarity, the same reference numerals are applied to the identical parts of the left and right hand link assemblies just described and which function to actuate the ejector blade within the bowl.

For further manipulation and bowl elevation control, two support link assemblies 57 and 58 are employed which are solely completely mounted on the crawler tractor and which connect with the bowl, these assemblies also being constructed left and right handed. The same reference numerals will be used for identical parts of the left and right hand assemblies to simplify the description and the added use of numbers.

The near side supporting link assembly 57 is best shown in FIG. 1 and comprises a combined dual link and shaft unit forming a bell crank having a bowl lift link 59 pivotally joined at 60 with a bowl pivot on the bowl side, link 59 being fixed on shaft 61 mounted on a bracket 62 suitably secured at 63 to the crawler tractor 41, together with a second link arm 64 secured to shaft 61 to complete this bell crank unit. A hydraulic power cylinder 65 is provided to swing the bell crank means described and this cylinder is swingably carried on pivot pin 66 on the crawler tractor and the ram 67 of the cylinder extends to the end of link arm 64 for connection with the pivot pin 68 thereon. Thus the expansion and contraction of the cylinders such as 65 will swing the bell crank means about shafts 61 to raise or to lower the bowl in a rocking motion about the forward wheel means 21 of the bowl assembly. This dual link arrangement, therefore, provides a means to control the bowl elevation over the working surface and a means for guidedly manipulating the movements of the bowl over the surface on the front wheeled bowl support assembly. It should also be observed that the link structures 43 and 44 for the ejector blade will also contribute to the bowl maneuvering manipulation as brought about by the steering action of the attendant vehicle.

Cylinders 65—65 may also be supplied from a hydraulic pressure source through an equal flow valve and hydraulic lines to synchronize the action of the left and right hand bell crank units for raising and lowering the scraper bowl according to conditions of operation.

It should be understood that the bell crank means may also be referred to as link assemblies so that the disclosure may be regarded as link means to regulate the position of the ejector blade and link means to adjust the elevation of the scraper bowl in relation to the ground.

The two sets of link means just mentioned are paired at each side of the centerline of the joined tandem vehicle and scraper units. It should be observed that when the link means that regulate the ejector blade are actuated to fully retract the blade against the spaced side wall stops 28—28 and 29—29, that the pin axes of pins 47 and 48 of the drag link 46 occupy coincident positions with the respective pivot pin 60 on the bowl and the shaft 61 on bracket 62 of the lift link or arm 59 as best illustrated in the full line showing of this arrangement in FIG. 1 or in the full line and dot and dash line showing in FIG. 3 of the lift link assembly and of the retracted ejector blade link assembly.

This relationship introduces a coaction between the described parts of the two link structures mentioned whereby the ejector blade when fully retracted will maintain that position against stops 28—28 and 29—29 during any vertical adjustment or regulation of the scraper bowl by the supporting link assemblies such as 57 and 58. Once the proper position of the bowl has been established for transport or material discharge it is an easy matter to adjust the closure hood 6 and to then energize the ejector blade push link means to move the blade in the bowl to obtain the rate of discharge of the material according to the dictates of the operator on the attendant vehicle.

In the operation of the ejector blade, it is also to be noted that a forward limit for blade 27 movement is required to prevent the stabilizing structures 31 and 32 from becoming locked with the links of such units in a straight line or a straight arm position. Any suitable stop or limit means may be employed to bring the ejector blade 27 to a forward position such as 27a in FIG. 3 with the links such as 33–34 and 37–38 having their central pivotal means offset inwardly of the bowl from a normal straight line relationship. Retraction of the link means 43 and 44 will then permit the links to collapse inwardly of the bowl again to finally come to their full line positions best shown in FIG. 3 with the blade fully retracted.

To obtain this limit feature it is possible to limit the ram 56 stroke of cylinder 53 or to provide other suitable stop means. As one example, link 49 is shown as provided with a tailpiece 69 that is made with an arm 70 to carry a foot or shoe 71 that will engage the top edge of the bracket 52 as shown in FIG. 2 to lock the link means for the ejector blade in a given position and in one where the links 33–34 and 37–38 will remain slightly cocked with blade 27 in full discharge position as illustrated in broken lines in FIG. 3.

Attention is also directed to the location of the link means connection with the fixed arm 45 on the blade 27. Arm 45 is vertically positioned for link actuation in a location intermediate the vertical locations of the coacting stabilizing link arrangements that connect with the top and bottom portions of the ejector blade 27. In this way the stabilizing means are not subjected or too greatly influenced as to their functions by the pressure or pull applied to blade 27 by the link means connection with the intermediate arm 45 of the ejector blade.

The above description of an exemplary suggested form of the present invention is not to be considered by way of limitation of the structural concept of the invention. Changes are contemplated in the combination shown or in the individual elements of the combinations provided without departing from the specific invention described. The extent of such modifications or of such changes are only to be limited by the breadth and scope of the language contained in the following claimed subject matter directed to the scraper bowl manipulating apparatus attachable with and operable from an attendant vehicle of the present invention.

What I claim is:

1. A scraper bowl assembly and vehicle combination comprising a scraper bowl, a transverse ejector blade in said bowl for bodily fore and aft translatory movement therethrough, first and second powered link means for manipulating said ejector blade fore and aft through said bowl and for raising and lowering said bowl with respect to the surface being worked, said first link means comprising a terminal link pivotally connected between a pivotal point on said first link means and a pivotal point on a part of said ejector blade, said second link means comprising a terminal link pivotally connected between a pivotal point on said second link means and a pivotal point on said bowl, the distance between said pivotal points on said first terminal link being substantially the same as the distance between said pivotal points of said second terminal link; and said pivotal points on said first and second links and said pivotal points on said ejector blade and said bowl being located for substantial coaxial disposition on separate axes when said ejector blade is fully retracted by said first link means.

2. In the claim 1 combination, the addition of stabilizing structures connected with said scraper bowl and with said ejector blade to hold said blade in a predetermined angular position in relation to the bowl walls during the actuation of said ejector blade through said bowl by said link means.

3. The combination of claim 2 wherein said stabilizing structures comprise sets of expanding and collapsing cooperative links acting from folded positions with the ejector blade retracted to extended substantial straight line positions with the ejector blade in full advanced position, and stop means are provided to limit the movement of the link means in a position wherein said stabilizing link structures are maintained out of complete extended alignment to readily recollapse upon retraction of said link means to retract said ejector blade into the bowl loading position.

4. In combination, a scraper bowl assembly and attendant vehicle therefor comprising a scraper bowl, a transverse ejector blade movably carried in said bowl for bodily fore and aft translatory motion therethrough, link means mounted on said attendant vehicle and connected with said transversely positioned ejector blade to bodily actuate said blade through said bowl including power means to actuate said link means, and a drag link pivotally connected at one end with an ejector part and having its other end pivotally connected with a part of said link means, support link mechanism mounted upon said attendant vehicle and pivotally connected with said scraper bowl including power means to activate said link mechanism to raise or lower said bowl in relation to the surface being worked, and a lift link pivotally connected with said bowl at one end and pivotally connected with said support link mechanism at another end, said drag link and lift link providing coacting means to axially align their opposite end pivotal means respectively when said ejector blade is made to occupy a given position in the length of said bowl to permit vertical manipulation of said bowl by said support link mechanism without inducing displacement of said ejector blade by said blade actuating link means.

5. In the combination of claim 4, with the addition of stop means on said bowl to engage said ejector blade when in a full open bowl position, which position is such as to cause said drag link and said lift link to assume the positions that places their end pivotal means in coaxial relationship with said blade fully retracted in said bowl.

6. In the combination of claim 4 wherein said scraper bowl assembly comprises a road working scraper being wheel supported at one end and said attendant vehicle comprises a power driven tractor to manipulate and control the movements of said scraper bowl, said link means and said support link mechanism both providing maneuvering means to steer and guide said scraper bowl while the link means controls the position of said ejector blade from said tractor and said support link means controls the elevation of the connected end of said bowl in relation to the surface being worked.

7. In the combination in claim 4 wherein said power means for said link means comprises a hydraulic cylinder mounted on said attendant vehicle and connected with an element of said link means, and said power means for said support link mechanism comprises a hydraulic cylinder mounted on said same attendant vehicle and connected with an element of said support link mechanism.

8. In the claim 4 combination, the addition of stabilizing structures connected with said scraper bowl and with said ejector blade to hold said blade in a predetermined angular position in relation to the bowl walls during the actuation of said ejector blade through said bowl by said link means.

9. In the claim 2 combination, wherein said stabilizing structures for the blade are vertically spaced above the floor wall of said scraper bowl, and wherein said link means is connected with said ejector blade intermediate the vertically spaced stabilizing structures for active actuation of the ejector blade at a level between said vertically spaced stabilizing structures.

10. In the combination in claim 8 wherein said stabilizing link structures comprise sets of expanding and collapsing cooperative links acting from folded positions with the ejector blade retracted to extended substantial straight line positions with the ejector blade in full advanced position, and stop means are provided to limit the movement of the link means in a position wherein said stabilizing link structures are maintained out of complete extended alignment to readily recollapse upon retraction of said link means to retract said ejector blade into the bowl loading position.

References Cited

UNITED STATES PATENTS

| 2,169,946 | 8/1939 | Frentzel et al. | 37—126 |
| 2,252,763 | 8/1941 | French | 37—126 |
| 2,406,300 | 8/1946 | Le Tourneau | 37—126 |
| 2,445,053 | 7/1948 | Allin | 37—126 |
| 2,994,976 | 8/1961 | Hancock | 37—126 |
| 3,039,212 | 6/1962 | Donner | 37—129 |
| 3,325,925 | 6/1967 | Hermiz et al. | 37—126 XR |
| 3,330,054 | 7/1967 | Martin | 37—124 |

EDGAR S. BURR, *Primary Examiner.*

U.S. Cl. X.R.

37—126